UNITED STATES PATENT OFFICE 2,315,899

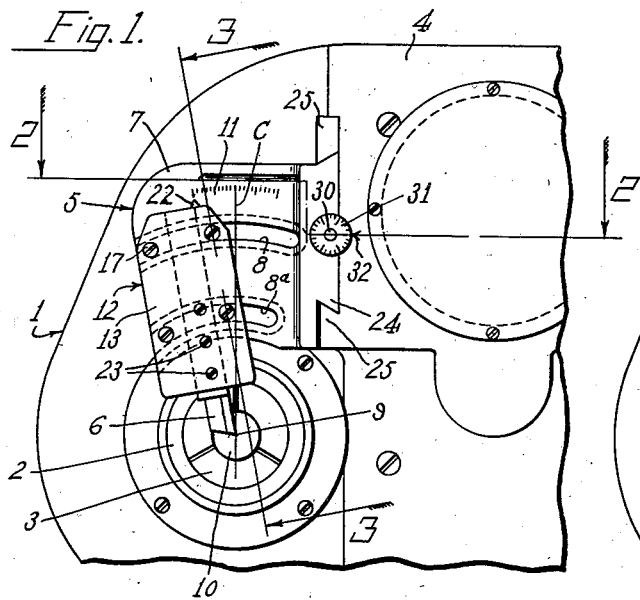
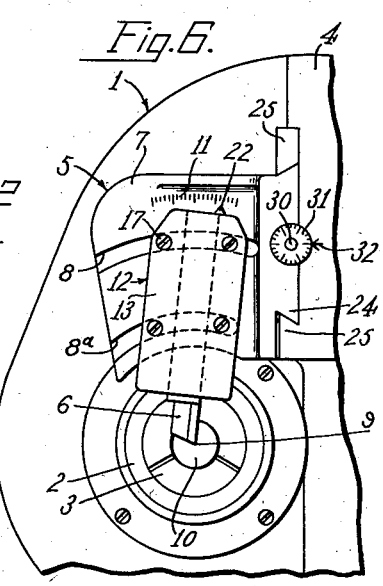
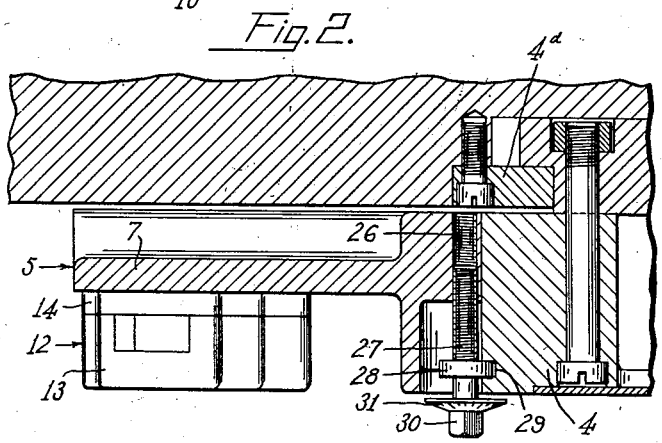
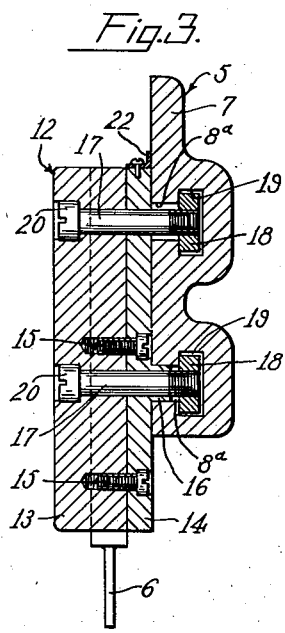
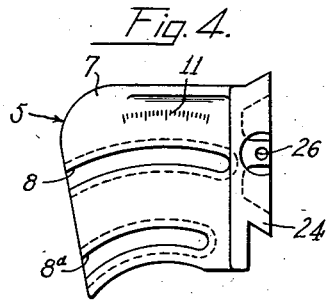
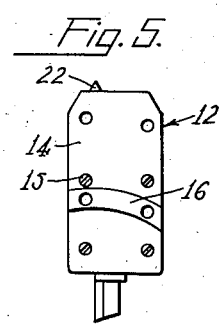
INVENTOR.
Raymond L. Kuehn.
By
ATTORNEY.

MACHINE TOOL

Raymond L. Kuehn, Hartford, Conn., assignor to The Billings & Spencer Company, a corporation of Connecticut Application July 14, 1941, Serial No. 402,306

20 Claims. (Cl. 164—36)

My invention relates to machine tools.

It has among its objects to provide improved supporting and rake adjusting mechanism for the cutting off tool of a machine tool. A further object of my invention is to provide such improved mechanism wherein it is made possible to adjust the rake of the cutting off tool in an improved and simplified manner so that the rake may be varied as desired to accord with variations in speed of operation or in the material or tool used. A still further object of my invention is to provide such improved tool supporting and adjusting means whereby it is also made possible to vary the longitudinal position of the tool as desired relative to the work, and to vary this longitudinal adjustment without disturbing the rake adjustment. Still other objects of my invention are to provide such an improved mechanism which is adapted to be applied to existing machines with a minimum of change therein, and one which is capable of being precisely adjusted over a wide range, while being held securely in its several positions of adjustment, and having its adjustment readily and quickly changed when desired. These and other objects and advantages of my improvement will, however, hereinafter more fully appear.

In the accompanying drawing, I have shown for purposes of illustration one embodiment which my invention may assume in practice.

In this drawing,

Figure 1 is a front elevation of my improved tool supporting and adjusting mechanism in operative position on a machine;

Fig. 2 is an enlarged section on line 2—2 of Figure 1 showing the connection of the same to the vertical tool slide and the longitudinal adjusting mechanism;

Fig. 3 is an enlarged section on line 3—3 of Fig. 1;

Fig. 4 is a front elevation of the carrier plate per se;

Fig. 5 is a rear elevation of the tool holder per se, and

Fig. 6 is a view similar to Fig. 1, but showing the tool holder in a different position of adjustment on the carrier plate.

In this illustrative construction, I have shown my invention applied to a machine tool, generally indicated at 1, and having a usual tool rotating spindle 2 carrying a usual collect 3, and also having a vertical tool slide 4 on one side of and above the spindle 2 and vertically reciprocable in guides 4a through suitable mechanism, not shown; my improved tool supporting and adjusting mechanism, generally indicated at 5, being carried on one side of the slide 4 and including improved means, hereinafter described, for supporting and adjusting a cut-off tool 6.

Referring more particularly to the adjusting mechanism 5, it will be noted that the same herein includes a carrier plate 7 attached to and vertically movable bodily with the slide 4 and projecting laterally therefrom above the exposed end of the collect 3. Herein this plate has a plurality of arcuate slots 8 and 8a therein struck about the axis 9 of the work 10 which is gripped in the collect 3. In a preferred construction, these arcuate slots 8 and 8a are spaced one above the other, with the slot 8 above the slot 8a and longer than the latter. As shown in Fig. 1, both slots have outer open ends at the left and closed inner ends at the right, while the slots are of such length as to permit a substantial range of tool adjustment therein on either side of a vertical line, herein indicated at C, passing through the axis 9 of the work. In a preferred construction, the plate 7 is also provided with graduations 11 disposed in an arc spaced above the upper slot 8 and struck about the same axis 9 and extending on opposite sides of this line C.

As shown, the tool 6 is carried in an improved tool holder generally indicated at 12, and comprising two parts 13 and 14, connected by screws 15 and adapted to clamp the shank of the tool 6 between these parts. Herein, the part 14 has a raised arcuate rib 16 toward the bottom of the back thereof and receivable in the slot 8a. Further, a pair of laterally spaced clamping bolts 17 is provided extending through the members 13 and 14 and the rib 16; these bolts 17 herein having nuts 18 on their inner ends received in widened portions 19 of the slot 8a while the outer ends of these bolts have slotted heads 20 countersunk in the front face of the member 13. Herein, like clamping bolts 17 are similarly provided at the top of the work holder and are similarly adjustably connected in the slot 8. Attention is also directed to the fact that the holder member 14 herein is also provided on its top and at one side of its longitudinal center line, with a pointer 22 fixed thereto and adapted to be adjusted relative to the adjacent graduations 11. If desired, the shank of the tool 6 may also be suitably fixed in the holder member 13 as by a plurality of screws 23. Thus it will be evident that upon suitably releasing the bolts 17 with a screw driver, it is possible for the entire tool holder 12 to be adjusted laterally in slots 8, 8a, as desired in either direction while the bolts remain in these slots, and in such manner as to adjust the rake of the tool 6 as desired, with each position of adjustment clearly indicated by the position of the pointer 22 relative to the graduations 11.

Improved means are herein also provided for enabling adjustment of the entire tool supporting and rake adjustment mechanism bodily relative to the vertical tool slide 4 to vary the position of the tool 6 longitudinally along the work 10, as desired. Herein, this means includes a bevelled guide portion 24, provided on the inner end of the plate 7 and receivable in suitable cooperating vertically spaced bevelled guides 25 carried on the adjacent side edge of the tool slide 4. Herein, a threaded longitudinal bore 26 is also provided in the bevelled guide portion and a threaded adjusting member 27 is threaded into the same and provided with an integral rotatable collar 28 received in a corresponding recess 29 in the adjacent wall of the slide 4. As shown, the threaded adjusting member 27 is also provided with a nut 30 on its outer extremity, while a graduated flange 31 is provided thereon between the nut and the front face of the slide 4 and rotatable relative to a pointer or other indicating mark 32 on the front face of the slide 4. Thus, when it is desired to adjust the plate 7 to adjust the tool 6 longitudinally of the work, such an adjustment may be readily made by merely applying a wrench to the nut 30 at the outer end of the adjusting member 27 and rotating the latter into the desired relation of the graduations on the flange 31 relative to the indicating pointer 32; the member 7 then moving bodily in the desired direction along the threaded member 27 which is in turn fixed against longitudinal movement relative to the slide 4.

In the use of my improved construction, it is made possible to vary the rake of the tool 6 very quickly and conveniently, it only being necessary to release the bolts 17 with a screw driver, and after adjusting the pointer 22 into the desired position, again tighten the bolts. In all positions of the tool 6, it will also be noted that the tip of the same always lies in the vertical line C passing through the axis 9 of the work in such manner as to insure a clean cutting off action as the slide 4 moves downward during the cutting off operation. Further, it will be observed that this continues to be true irrespective of the downward vertical position of adjustment of the tool 6 in the holder 12 as the tool wears. Moreover, whenever it is desired to vary the longitudinal position of the tool 6 relative to the spindle, this is readily accomplished by a simple adjustment of the member 27 in the desired direction.

As a result of my improvements, it is made possible very quickly and conveniently to make a wide range of precise adjustments and thereby very materially to increase the possible range of use of the cutting off tool. Attention is also directed to the fact that my improved adjusting mechanism is capable of being provided at small expense, and capable of being furnished as original equipment or as a special attachment, if desired. These and other advantages of my improvements will, however, be apparent to those skilled in the art.

While I have in this application specifically described one embodiment which my invention may assume in practice, it will be understood that this form has been shown for purposes of illustration, and that the same may be modified and embodied in various other forms without departing from its spirit or the scope of the appended claims.

What I claim as new and desire to secure by Letters Patent is:

1. In a machine tool, a work rotating spindle, a slide movable relative thereto, a tool movable with said slide and operative on work in said spindle, and means between said tool and slide for enabling adjustment of the rake of said tool in all positions of said slide about axes in a straight line extending through the axis of said spindle and the tip of said tool.

2. In a machine tool, a work rotating spindle, a slide movable relative thereto, a tool movable with said slide and operative on work in said spindle, and means between said tool and slide and including arcuate guide means struck about the axis of said spindle when the point of said tool is at said axis for enabling adjustment of the rake of said tool relative to the work in said spindle.

3. In a machine tool, a work rotating spindle, a slide movable relative thereto, a tool movable with said slide and operative on work in said spindle, and means between said tool and slide and including arcuate guide means struck about the axis of said spindle when the point of said tool is at said axis and extending on opposite sides of a straight vertical line perpendicular to said axis for enabling adjustment of the rake of said tool relative to the work in said spindle.

4. In a machine tool, a work rotating spindle, a slide movable relative thereto, a tool movable with said slide and operative on work in said spindle, and means between said tool and slide and including a plurality of spaced arcuate guide means struck about the axis of said spindle when the point of said tool is at said axis for enabling adjustment of the rake of said tool relative to the work in said spindle.

5. In a machine tool, a work rotating spindle, a slide movable relative thereto, a tool movable with said slide and operative on work in said spindle, and means between said tool and slide and including a plurality of spaced arcuate guide means struck about the axis of said spindle when said tool is in extreme cutting position for enabling adjustment of the rake of said tool relative to the work in said spindle and each extending on opposite sides of a vertical line passing through said axis and perpendicular thereto.

6. In a machine tool, a work rotating spindle, a slide movable relative thereto, a tool movable with said slide and operative on work in said spindle, means between said tool and slide and including arcuate guide means struck about the axis of said spindle when the point of said tool is at said axis for enabling adjustment of the rake of said tool relative to the work in said spindle, and holding means in said guide means and releasable from one face of the latter.

7. In a machine tool, a work rotating spindle, a slide movable relative thereto, a tool movable with said slide and operative on work in said spindle, means between said tool and slide and including arcuate guide means struck about the axis of said spindle when the point of said tool is at said axis for enabling adjustment of the rake of said tool relative to the work in said spindle, and cooperating indicating means on said slide and adjustable relative thereto with said tool.

8. In a machine tool, a work rotating spindle, a vertically reciprocable slide movable relative thereto, a tool movable with said slide and operative on work in said spindle and having its tip disposed in a vertical line extending through the axis of said spindle, and means between said tool and slide for enabling adjustment of the rake of said tool relative to the work in said spindle while maintaining said tip in said line.

9. In a machine tool, a work rotating spindle, a slide movable relative thereto, a tool movable with said slide and operative on work in said spindle, means between said tool and slide for enabling adjustment of the rake of said tool relative to the work in said spindle, and means for adjusting said rake adjusting means and said tool longitudinally on said slide relative to the work.

10. In a machine tool, a work rotating spindle, a slide movable relative thereto, a tool movable with said slide and operative on work in said spindle, means between said tool and slide for enabling adjustment of the rake of said tool relative to the work in said spindle, and means for adjusting said rake adjusting means and said tool longitudinally on said slide relative to the work including a longitudinally adjustable slide between said first mentioned slide and tool and carrying said rake adjusting means.

11. In a machine tool, a work rotating spindle, a slide movable relative thereto, a tool movable with said slide and operative on work in said spindle, means between said tool and slide for enabling adjustment of the rake of said tool relative to the work in said spindle, and means for adjusting said rake adjusting means and said tool longitudinally on said slide relative to the work including a longitudinally adjustable slide between said first mentioned slide and tool and carrying said rake adjusting means and adjusting means for said longitudinally adjustable slide having operating means at one end thereof.

12. In a tool supporting and rake adjusting mechanism, a tool supporting plate having arcuate guiding means thereon struck about an axis beyond one edge of said plate, and a tool adjustably positioned in said guiding means and having its tip disposed in said axis in all positions of adjustment of said tool in said arcuate guiding means.

13. In a tool supporting and rake adjusting mechanism, a tool supporting plate having arcuate guiding means thereon struck about an axis beyond one edge of said plate and including arcuate slots struck about the same axis and one between the other and said edge, and a tool holder adjustably positioned in said guiding means and having a tool projecting beyond said edge and having its tip disposed in said axis in all positions of adjustment of said tool in said arcuate guiding means.

14. In a tool supporting and rake adjusting mechanism, a tool supporting plate having arcuate guiding means thereon struck about an axis beyond one edge of said plate, and a tool holder adjustably positioned in said guiding means and having a tool projecting beyond said edge, said tool having its tip disposed in a straight line passing through both said axis and said guiding means in all positions of said holder in said guiding means.

15. In a tool supporting and rake adjusting mechanism, a tool supporting plate having arcuate guiding means thereon struck about an axis beyond one edge of said plate, and a tool holder adjustably positioned in said guiding means and having a tool projecting beyond said edge, said tool being arcuately adjustable with said holder and having its tip disposed in a straight line passing through said axis in all adjusted positions of said tool.

16. In a tool supporting and rake adjusting mechanism, a tool supporting plate having arcuate guiding means thereon struck about an axis beyond one edge of said plate, a tool holder adjustable in said guiding means on one face of said plate and having a tool projecting beyond said edge and having its tip disposed in said axis in all positions of adjustment of said tool in said arcuate guiding means, and clamping means for said holder operable from the outer face of the latter.

17. In a tool supporting and rake adjusting mechanism, a tool supporting plate having arcuate guiding means thereon struck about an axis beyond one edge of said plate, a tool holder adjustably positioned in said guiding means and having a tool projecting beyond said edge and having its tip disposed in said axis in all positions of adjustment of said tool in said arcuate guiding means, a slide adjustable relative to a support and carrying said plate and disposed perpendicularly relative to said tool, and means for adjusting said slide and plate relative to the support.

18. In a tool supporting and rake adjusting mechanism, a tool supporting plate having arcuate guiding means thereon struck about an axis beyond one edge of said plate, a tool holder adjustably positioned on one face of said plate in said guiding means and having a tool projecting beyond said edge and having its tip disposed in said axis in all positions of adjustment of said tool in said arcuate guiding means, a slide adjustable relative to a support and carrying said plate and disposed perpendicularly relative to said tool, and means for adjusting said slide and plate relative to a support including a threaded adjusting member carried on said slide perpendicularly relative to said tool.

19. A tool supporting and rake adjusting plate having spaced arcuate guiding means thereon struck about a common center beyond one edge of said plate, and a slide carrying said plate and disposed perpendicularly to said plate and arcuate guiding means and along a side margin of said plate.

20. A work holder comprising cooperating tool clamping members adapted to receive a tool therebetween, one of said members having an arcuate guiding portion thereon and both members having spaced apertures disposed in spaced arcs struck about a common axis and one set of spaced apertures extending through said arcuate guiding portion, and clamping means disposed in said apertures.

RAYMOND L. KUEHN.